US012092318B1

(12) United States Patent
Lee et al.

(10) Patent No.: US 12,092,318 B1
(45) Date of Patent: Sep. 17, 2024

(54) LIGHTING MODULE AND LINEAR LIGHT-GUIDING UNIT THEREOF

(71) Applicant: CREATIVE SENSOR INC., Taipei (TW)

(72) Inventors: Ming-Ju Lee, Taipei (TW); Hung-Ming Chang, Taipei (TW)

(73) Assignee: CREATIVE SENSOR INC., Taipei (TW)

( * ) Notice: Subject to any disclaimer, the term of this patent is extended or adjusted under 35 U.S.C. 154(b) by 0 days.

(21) Appl. No.: 18/200,252

(22) Filed: May 22, 2023

(51) Int. Cl.
*F21Y 115/10* (2016.01)
*F21V 7/00* (2006.01)

(52) U.S. Cl.
CPC ............ *F21V 7/0066* (2013.01); *F21V 7/005* (2013.01); *F21Y 2115/10* (2016.08)

(58) Field of Classification Search
CPC ..... F21V 7/0066; F21V 7/005; F21Y 2115/10
See application file for complete search history.

(56) References Cited

U.S. PATENT DOCUMENTS

| | | | | |
|---|---|---|---|---|
| 6,283,602 B1 * | 9/2001 | Kawaguchi | G02B 6/0028 362/23.1 |
| 2004/0234229 A1 * | 11/2004 | Yagi | G02B 6/0028 385/146 |
| 2008/0278658 A1 * | 11/2008 | Kim | G02F 1/133528 349/63 |
| 2009/0034278 A1 * | 2/2009 | Tessnow | F21S 41/24 362/511 |
| 2009/0201696 A1 * | 8/2009 | Kamikatano | G02B 6/001 362/551 |
| 2010/0208490 A1 * | 8/2010 | Tsuchiya | G02B 6/003 362/606 |
| 2013/0044505 A1 * | 2/2013 | Ye | G02B 6/0006 362/555 |

FOREIGN PATENT DOCUMENTS

| | | |
|---|---|---|
| CN | 101718407 A | 6/2010 |
| JP | 2014041813 A | 3/2014 |
| JP | 2021034372 A | 3/2021 |

(Continued)

OTHER PUBLICATIONS

English Translation of TW M347585, Zhu, published Dec. 2008 (Year: 2008).*

(Continued)

*Primary Examiner* — Evan P Dzierzynski
(74) *Attorney, Agent, or Firm* — Chun-Ming Shih; HDLS IPR SERVICES

(57) ABSTRACT

The disclosure discloses a light emitting module, including: a linear light-guiding unit, including a light incident surface located on a side end thereof and a protrusive reflection structure disposed on a bottom side thereof; and a light emitting unit, disposed on the light incident surface. The light emitting unit is configured to emit a light to enter the linear light-guiding unit through the light incident surface, and the light is reflected by the protrusive reflection structure. On a side view, a first included angle is defined between the protrusive reflection structure and the bottom side, and the first included angle is greater than or equal to 15.0 degrees and equal to or less than 35.0 degrees.

14 Claims, 7 Drawing Sheets

(56) References Cited

FOREIGN PATENT DOCUMENTS

| | | |
|---|---|---|
| TW | M347585 U | 12/2008 |
| TW | M437578 U | 9/2012 |

OTHER PUBLICATIONS

English translation of Yukihiko JP 2014041813, published Mar. 2014 (Year: 2014).*

Office Action dated Nov. 6, 2023 of the corresponding Taiwan patent application No. 112112008.

Office Action dated Dec. 19, 2023 of the corresponding Japan patent application No. 2023-086360.

Office Action dated Apr. 18, 2024 of the corresponding Taiwan patent application No. 112112008.

* cited by examiner

LIGHTING MODULE AND LINEAR LIGHT-GUIDING UNIT THEREOF

BACKGROUND OF THE DISCLOSURE

Technical Field

The present disclosure relates to a light emitting module, particularly relates to a light emitting module and a light-guiding unit thereof.

Description of Related Art

The linear light source used in the related-art contact image sensor (CIS) includes a light source, a light-guiding bar, and a white casing. The light source is disposed on one end of the light-guiding bar. After the light emitted from the light source enters the light-guiding bar, the light is totally reflected and transmitted to the other end of the light-guiding bar. Further, the light emits from a light emitting surface of the light-guiding bar through a micro structure of the light-guiding bar.

However, the light emitting diode (LED) used as the light source has following problems. The usable light is less near to the LED due to the light emitting angle and field distribution of the LED, thereby the area near the LED being relatively darker compared to the other area.

Therefore, how to provide a light emitting module and a light-guiding unit thereof, which may increase the light usage, is a problem that needs to be solved.

SUMMARY OF THE DISCLOSURE

The disclosure provides a light emitting module and a light-guiding unit thereof, which may increase the light usage.

The disclosure discloses a light emitting module, including: a linear light-guiding unit, including a light incident surface located on a side end thereof and a protrusive reflection structure disposed on a bottom side thereof; and a light emitting unit, disposed on the light incident surface. The light emitting unit is configured to emit a light to enter the linear light-guiding unit through the light incident surface, and the light is reflected by the protrusive reflection structure. On a side view, a first included angle is defined between the protrusive reflection structure and the bottom side, and the first included angle is greater than or equal to 15.0 degrees and equal to or less than 35.0 degrees.

In some embodiments, the protrusive reflection structure includes a plurality of protrusions, and the protrusions are equidistantly or non-equidistantly disposed on the bottom side.

In some embodiments, the first included angle is greater than or equal to 20.0 degrees and equal to or less than 30.0 degrees.

In some embodiments, the linear light-guiding unit further includes an arched light emitting structure disposed on a top side of the light-guiding unit opposite to the protrusive reflection structure, and the light reflected by the protrusive reflection structure emits from the arched light emitting structure.

In some embodiments, the arched light emitting structure includes a first width on a cross-sectional view, the bottom side of the linear light-guiding unit includes a second width on the cross-sectional view, and the first width is greater than the second width.

In some embodiments, a second included angle is defined between two side edges of the linear light-guiding unit, and the second included angle is greater than or equal to 10.0 degrees and equal to or less than 50.0 degrees.

In some embodiments, the linear light-guiding unit further includes a first reflection surface and a second reflection surface, the first reflection surface and the second reflection surface are located on the bottom side, the first reflection surface is adjacent to the light incident surface, the second reflection surface is adjacent to the first reflection surface, the first reflection surface and the second reflection surface are located at different planes, and the protrusive reflection structure is disposed on the first reflection surface and the second reflection surface.

The disclosure also discloses a light emitting module, including: a linear light-guiding unit, including a light incident surface and a step structure, the light incident surface located on a side end thereof, and the step structure located on a bottom side thereof and disposed adjacently to the light incident surface; and a light emitting unit, disposed adjacently to the light incident surface. The light emitting unit is configured to emit a light to enter the linear light-guiding unit through the light incident surface, and the light is reflected by the step structure.

In some embodiments, the linear light-guiding unit further includes an arched light emitting structure disposed on a top side of the light-guiding unit opposite to the step structure, and the light reflected by the step structure emits from the arched light emitting structure.

In some embodiments, the arched light emitting structure includes a first width on a cross-sectional view, the bottom side of the linear light-guiding unit includes a second width on the cross-sectional view, and the first width is greater than the second width.

In some embodiments, the linear light-guiding unit is tapered from the first width to the second width on the cross-sectional view.

In some embodiments, a second included angle is defined between two side edges of the linear light-guiding unit, and the second included angle is greater than or equal to 10.0 degrees and equal to or less than 50.0 degrees.

In some embodiments, the linear light-guiding unit further includes a protrusive reflection structure disposed on the bottom side.

In some embodiments, the protrusive reflection structure includes a plurality of protrusions, and the protrusions are equidistantly or non-equidistantly disposed on the bottom side.

In some embodiments, on a side view, a first included angle is defined between the protrusive reflection structure and the bottom side, and the first included angle is greater than or equal to 15.0 degrees and equal to or less than 35.0 degrees.

In some embodiments, the first included angle is greater than or equal to 20.0 degrees and equal to or less than 30.0 degrees.

The disclosure discloses a linear light-guiding unit, cooperated with a light emitting unit, and the linear light-guiding unit including: a light incident surface, located on a side end; and a protrusive reflection structure, located on a bottom side and disposed adjacently to the light incident surface. A light enters the linear light-guiding unit through the light incident surface, and the light is reflected by the protrusive reflection structure. On a side view, a first included angle is defined between the protrusive reflection structure and the bottom side, and the first included angle is greater than or equal to 15.0 degrees and equal to or less than 35.0 degrees.

In some embodiments, the linear light-guiding unit further includes: an arched light emitting structure, disposed on a top side of the light-guiding unit opposite to the protrusive reflection structure, and the light reflected by the protrusive reflection structure emits from the arched light emitting structure.

In some embodiments, the first included angle is greater than or equal to 20.0 degrees and equal to or less than 30.0 degrees.

In some embodiments, the linear light-guiding unit further includes: a step structure, located on the bottom side and disposed adjacently to the light incident surface, and the protrusive reflection structure disposed thereon.

In summary, the light emitting module and the linear light-guiding unit thereof in the disclosure include a step structure disposed adjacently to the light incident surface, thereby decreasing the influence from the light emitting angle and field distribution of the light emitting unit. The reason is that, the step structure may decrease the distance of the incident light to the reflection surface, which makes the reflection path of the incident light shorter and also decreases the outgoing path, and further increase light usage. Moreover, the light emitting module and the linear light-guiding unit thereof in the disclosure also include an arched light emitting structure located on the light emitting surface of the linear light-guiding unit, thereby decreasing scattering light to concentrate the outgoing light. Comparing to using the other reflection structure for preventing scattering light, the disclosure may further increase light output efficiency and decrease total cost. Further, the light emitting module and the linear light-guiding unit thereof in the disclosure may include a protrusive reflection structure disposed on the bottom side, thereby increasing light reflection efficiency and further increasing the light usage.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
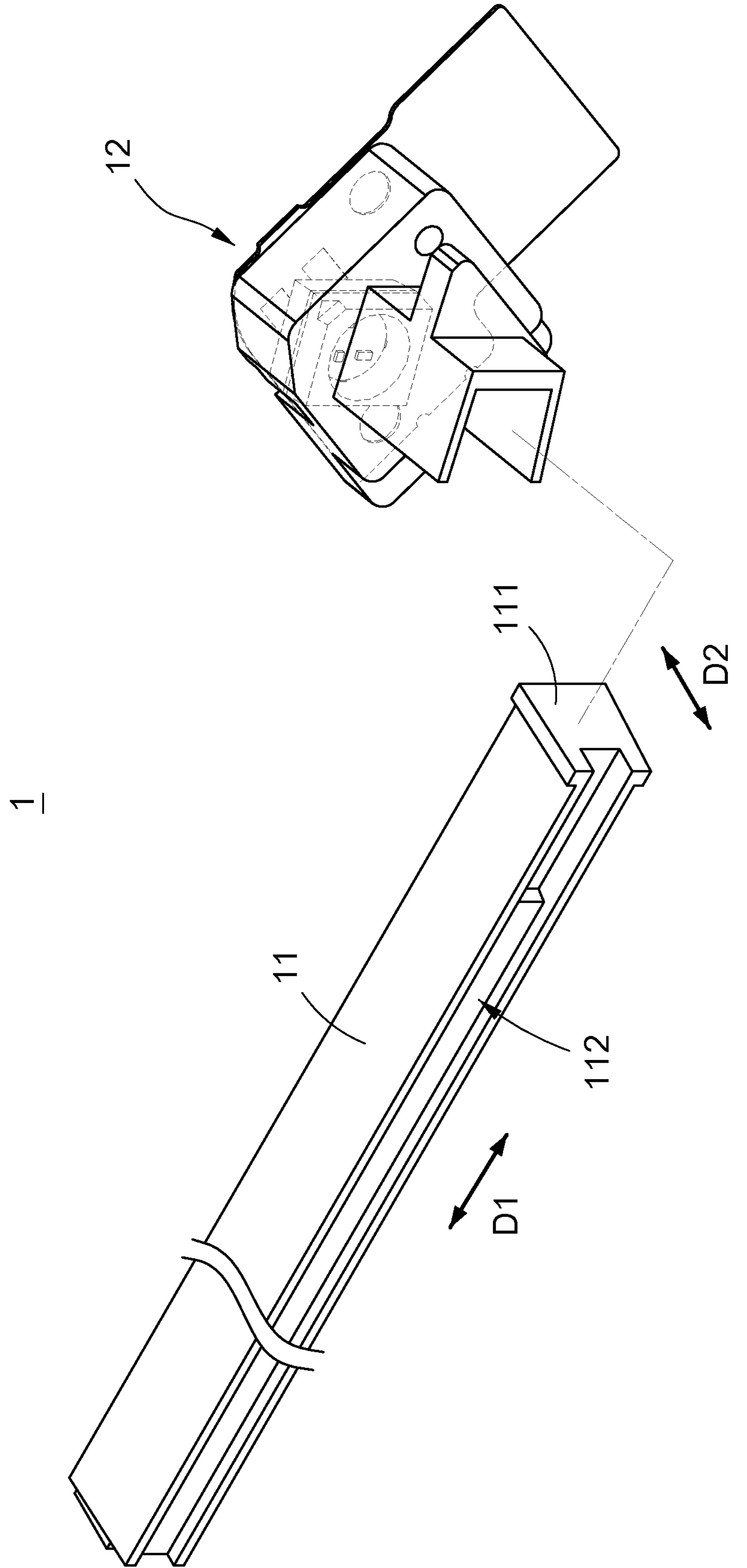
FIG. 1 is the exploded view of the light emitting module of the first embodiment in the disclosure.
Figure 2A:
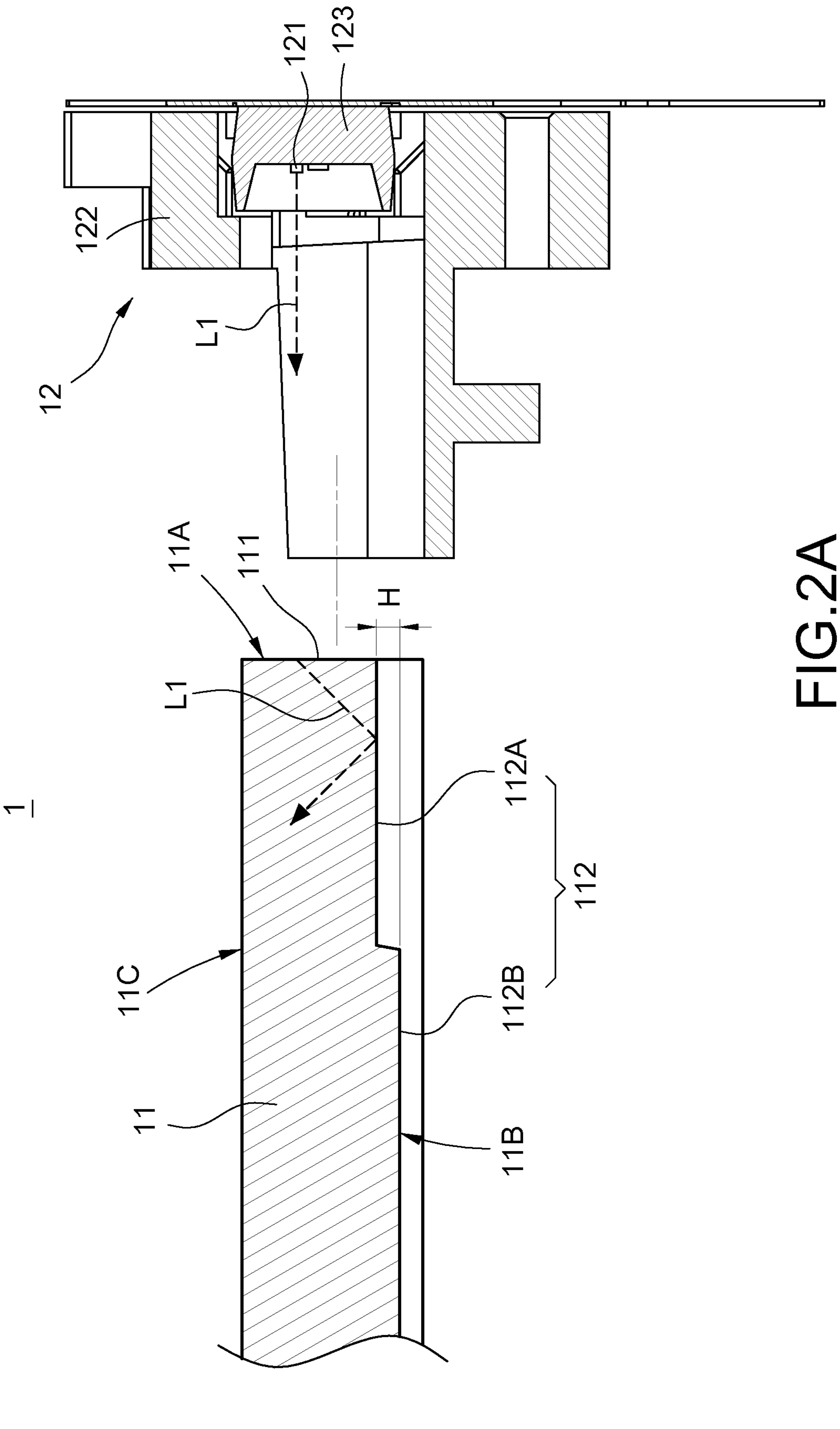
FIG. 2A is the cross-sectional view of the light emitting module of the first embodiment in the disclosure.
Figure 2B:
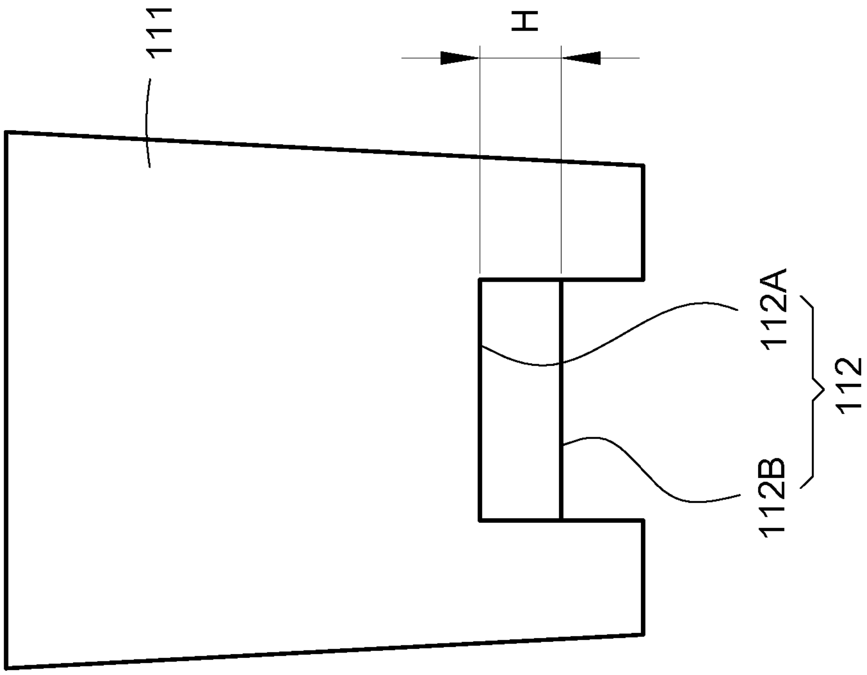
FIG. 2B is the side view of the linear light-guiding unit of the first embodiment in the disclosure.

FIG. 1 is the exploded view of the light emitting module 1 of the first embodiment in the disclosure. FIG. 2A is the cross-sectional view of the light emitting module 1 of the first embodiment in the disclosure. FIG. 2B is the side view of the linear light-guiding unit 11 of the first embodiment in the disclosure.

As shown in FIG. 1, FIG. 2A and FIG. 2B, the light emitting module 1 of the first embodiment in the disclosure includes a linear light-guiding unit 11 and a light emitting unit 12. The light emitting module 1 of the disclosure may be, for example, used in linear contact image sensor (CIS). CIS is used to scan the planar document with image or text into specific electronic format to facilitate storing, displaying, or transferring, etc. The main application of CIS may include desktop scanner, mobile scanner, fax machine, and multi-function printer, etc.

The linear light-guiding unit 11 is, for example, a light-guiding bar, and linearly extended along the major axis D1. The linear light-guiding unit 11 includes a light incident surface 111 and a step structure 112. The light incident surface 111 is located on the side end 11A of the linear light-guiding unit 11. The side end 11A is extended along the minor axis D2 of the linear light-guiding unit 11. In other words, the light incident surface 111 is located at the distal end of the linear light-guiding unit 11.

The step structure 112 is located on the bottom side 11B of the linear light-guiding unit 11 and disposed adjacent to the light incident surface 111. It should be noted that the bottom side 11B of the linear light-guiding unit 11 indicates the side opposite to the top side 11C. In the disclosure, the bottom side 11B is the side of the linear light-guiding unit 11 mainly using for reflecting light. In some embodiments, the step structure 112 may includes a first reflection surface 112A and a second reflection surface 112B, here is not intended to be limiting. The first reflection surface 112A is adjacent to the light incident surface 111, and the second reflection surface 112B is adjacent to the first reflection surface 112A. The first reflection surface 112A and the second reflection surface 112B are located at different planes. In other words, the step structure 112 begins from the light incident surface 111 and descends from the first reflection surface 112A to the second reflection surface 112B. The step height H between the first reflection surface 112A and the second reflection surface 112B is not limited, and the first reflection surface 112A and the second reflection surface 112B may be connected by a vertical surface or an oblique surface, here is not intended to be limiting. Further, the length of the first reflection surface 111A is not limited, the main requirement is to shorten the reflection path of the incident light.

It should be noted that the step number of the step structure 112 is not limited. That is, the step structure 112 may have more than two reflection surface located at different planes. Moreover, the same as above description, the step height between different reflection surfaces is not limited, and different reflection surfaces may be connected by the vertical surface or the oblique surface. Further, the same as above description, the length of each reflection surface is not limited.

The light emitting unit 12 is disposed adjacently to the light incident surface 111. The light emitting unit 12, for example, may include a plurality of light emitting diodes (LEDs) 121. The LED may include red light LED, orange light LED, yellow light LED, green light LED, blue light LED, and/or purple light LED, etc., and the LED may include the format of organic LED (OLED), here is not intended to be limiting. In some embodiments, the light emitting unit 12 may further include a casing 122, and the LEDs 121 are disposed on a circuit board 123 to be collectively disposed in the casing 122, here is not intended to be limiting. Further, the opening shape of the casing 122 may be, for example, matched with the profile of the linear light-guiding unit 11 to make the light emitting unit 12 be fixed on the side end 11A of the linear light-guiding unit 11 and make the LEDs be disposed correspondingly with the light incident surface 111 of the linear light-guiding unit 11. The light emitting unit 12 may also be free from the casing and only has the LEDs and the circuit board, and directly assembled to the light incident surface 111 of the linear light-guiding unit 11.

Therefore, the light emitting unit 12 may emit the light L1, and the light L1 enters the linear light-guiding unit 11 through the light incident surface 111. The light L1 entered to the linear light-guiding unit 11 is reflected by the first reflection surface 112A of the step structure 112, and emits from the top side 11C of the linear light-guiding unit 11. In other words, the first reflection surface 112A is distanced with the second reflection surface 112B by the step height H (that is, the first reflection surface 112A is higher than the second reflection surface 112B by the step height H), thereby the distance of the incident light L1 to the first reflection surface 112A being decreased.

In summary, the light emitting module 1 of the embodiment may decrease the influence from the light emitting angle and field distribution of the LEDs 121 of the light emitting unit 12. The reason is that, the step structure 112 may decrease the distance of the incident light L1 to the first reflection surface 112A, which makes the reflection path of the incident light L1 shorter and also decreases the outgoing path, and further increase light usage of the light emitting module 1.

Figure 3:
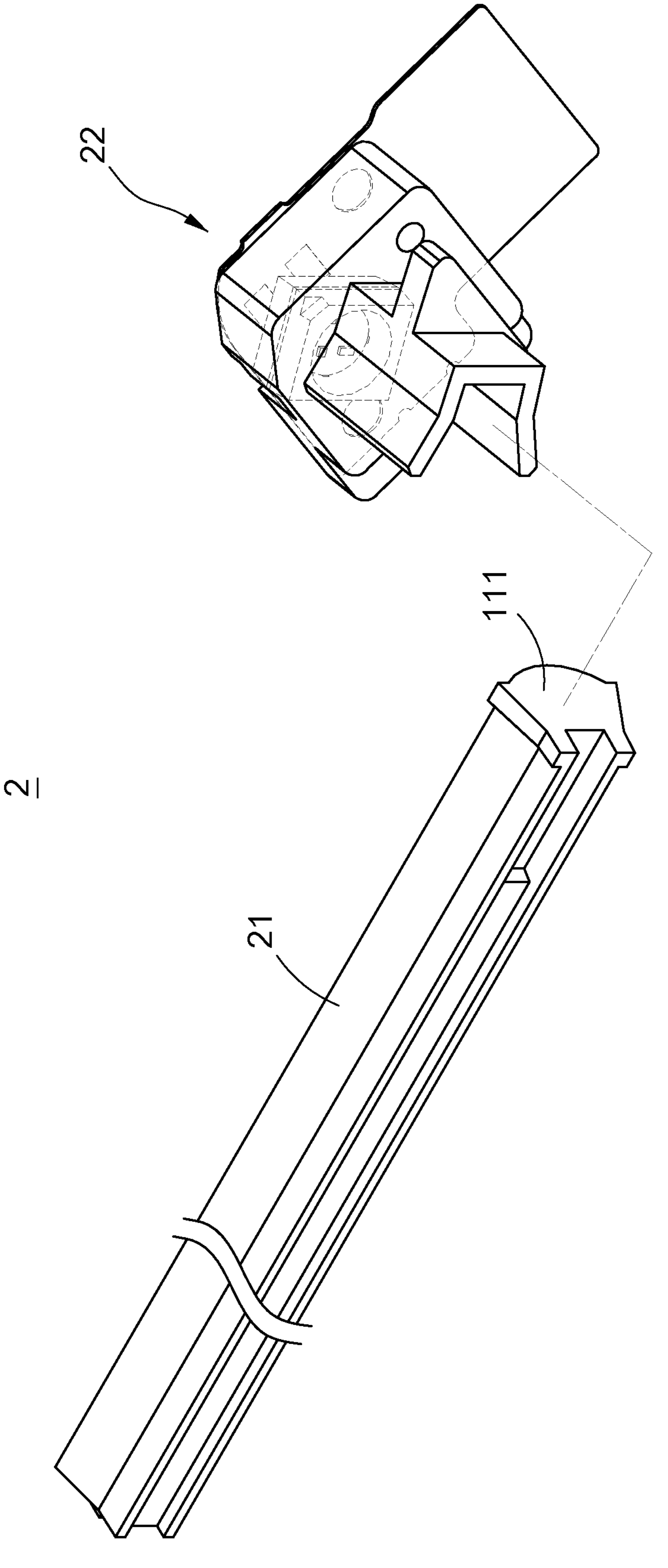
FIG. 3 is the exploded view of the light emitting module of the second embodiment in the disclosure.
Figure 4:
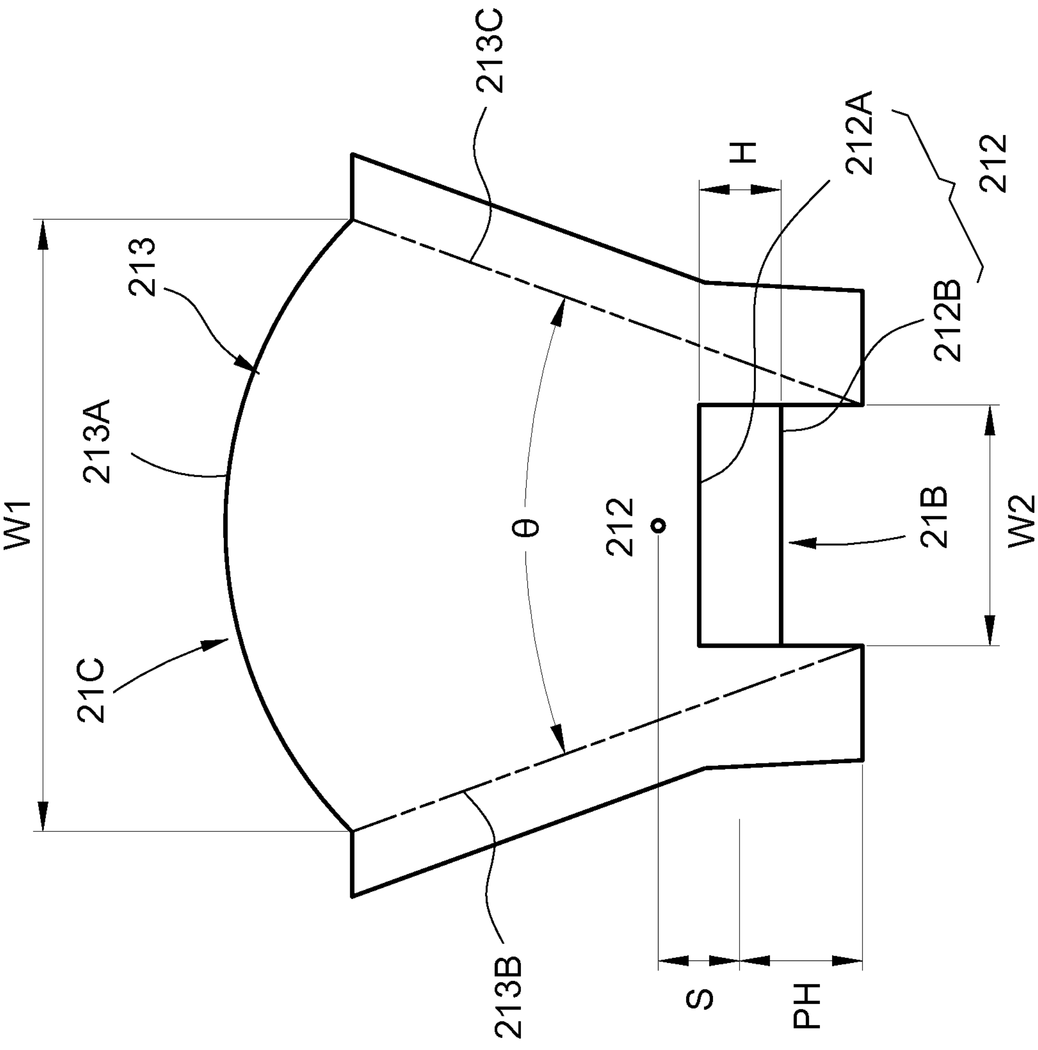
FIG. 4 is the side view of the linear light-guiding unit of the second embodiment in the disclosure.

FIG. 3 is the exploded view of the light emitting module 2 of the second embodiment in the disclosure. FIG. 4 is the side view of the linear light-guiding unit 21 of the second embodiment in the disclosure. As shown in FIG. 3 and FIG. 4, the light emitting module 2 of the second embodiment in the disclosure includes a linear light-guiding unit 21 and a light emitting unit 22. The light emitting unit 22 is similar to the light emitting unit 12 in the first embodiment, and here is omitted for brevity. The difference between the light emitting module 2 and the light emitting module 1 in the first embodiment is that the linear light-guiding unit 21 further includes an arched light emitting structure 213. The arched light emitting structure 213 is disposed on the top side 21C of the light-guiding unit 21 opposite to the step structure 212 (for example, the first reflection surface 212A and the second reflection surface 212B), and the light reflected by the step structure 212 emits from the arched light emitting structure 213.

It should be noted that the step number of the step structure 212 is not limited. That is, the step structure 212 may have more than two reflection surfaces located at different planes. Moreover, the same as above description, the step height between different reflection surfaces is not limited, and different reflection surfaces may be connected by the vertical surface or the oblique surface. Further, the length of each reflection surface is not limited.

In some embodiments, the arched light emitting structure 213 includes a first width W1 on the cross-sectional view (for example, the side surface in FIG. 4), the bottom side 21B of the linear light-guiding unit 21 includes a second width W2 on the cross-sectional view, and the first width W1 is greater than the second width W2. In some embodiments, the linear light-guiding unit 21 is tapered from the first width W1 to the second width W2 on the cross-sectional view: That is, the arched light emitting structure 213 has an arched surface 213A, and the linear light-guiding unit 21 has two side edges 213B, 213C tapered inward (or downward in FIG. 4).

In some embodiments, an included angle (second included angle) θ is defined between two side edges 213B, 213C of the linear light-guiding unit 21, here is not intended to be limiting. The included angle θ may be greater than or equal to 10.0 degrees and equal to or less than 50.0 degrees, here is not intended to be limiting. Further, the first width W1 of the arched light emitting structure 213 may be, for example, greater than or equal to 2.00 mm and less than or equal to 5.00 mm, here is not intended to be limiting.

Moreover, in the light emitting module 2, in order to make the cross-sectional area of the linear light-guiding unit 21 be greater than the light emitting area of the light emitting unit 22, the linear light-guiding unit 21 needs to have a predetermined height PH, and the center of the arched surface 213A of the arched light emitting structure 213 is distanced with the predetermined height PH by a distance S. In some embodiments, the predetermined height PH may be, for example, 2.5 mm, here is not intended to be limiting, the predetermined height PH may be different depending on different LEDs. Further, the distance S is, for example, greater than or equal to 0.00 mm and less than or equal to 2.00 mm, here is not intended to be limiting. Specifically, the distance S, the first width W1 and the included angle θ may be adjusted correspondingly with each other to obtain better angle of the outgoing light to decrease scattering light and concentrate the outgoing light. In some embodiments, the distance S may be, for example, 0.00 mm, the first width W1 may be 3.00 mm, and the included angle θ may be 20.0 degrees. In some other embodiments, the distance S may be 0.00 mm, the first width W1 may be 3.50 mm, and the included angle θ may be 30.0 degrees. In some other embodiments, the distance S may be 0.00 mm, the first width W1 may be 4.00 mm, and the included angle θ may be 40.0 degrees. In some other embodiments, the distance S may be 0.75 mm, the first width W1 may be 3.00 mm, and the included angle θ may be 30.0 degrees. In some other embodiments, the distance S may be 0.75 mm, the first width W1 may be 3.50 mm, and the included angle θ may be 40.0 degrees. In some other embodiments, the distance S may be 0.75 mm, the first width W1 may be 4.00 mm, and the included angle θ may be 20.0 degrees. In some other embodiments, the distance S may be 1.50 mm, the first width W1 may be 3.00 mm, and the included angle θ may be 40.0 degrees. In some other embodiments, the distance S may be 1.50 mm, the first width W1 may be 3.50 mm, and the included angle θ may be 20.0 degrees. In some other embodiments, the distance S may be 1.50 mm, the first width W1 may be 4.00 mm, and the included angle θ may be 30.0 degrees. It should be noted that the aforementioned parameters are merely examples, the setting may be different corresponding to different requirements.

Therefore, the light emitting unit 22 may emit the light L1, and the light L1 enters the linear light-guiding unit 21 through the light incident surface 211. The light L1 entered to the linear light-guiding unit 21 is reflected by the first reflection surface 212A of the step structure 212, and emits from the arched light emitting structure 213 on the top side 21C of the linear light-guiding unit 21. The first reflection surface 212A is distanced with the second reflection surface 212B by the step height H (that is, the first reflection surface 212A is higher than the second reflection surface 212B by the step height H), thereby the distance of the incident light L1 to the first reflection surface 212A being decreased.

In summary, the light emitting module 2 of the embodiment may decrease the influence from the light emitting angle and field distribution of the LEDs 221 of the light emitting unit 22. The reason is that, the step structure 212 may decrease the distance of the incident light L1 to the first reflection surface 212A, which makes the reflection path of the incident light L1 shorter and also decreases the outgoing path, and further increase light usage of the light emitting module 2.

Moreover, in the related art, part of the light may emit from the non-light incident surface during transmitting. Therefore, in the related-art linear light source, the feature of high reflectivity surface in the white casing is used to reflect the light back to the light-guiding bar for re-use. However, the forming of the white casing in the related-art structure is difficult to control, and the cost is higher. Further, if the reflection sheet is used to be attached on the surface of the light-guiding bar, the cost is also increased. Comparing to that, the light emitting module 2 of the embodiment may include the arched light emitting structure 213 located on the light emitting surface of the linear light-guiding unit 21, thereby decreasing scattering light to concentrate the outgoing light. Comparing to using the other reflection structure for preventing scattering light, that, the light emitting module 2 of the embodiment may further increase light output efficiency and decrease total cost.

Figure 5:
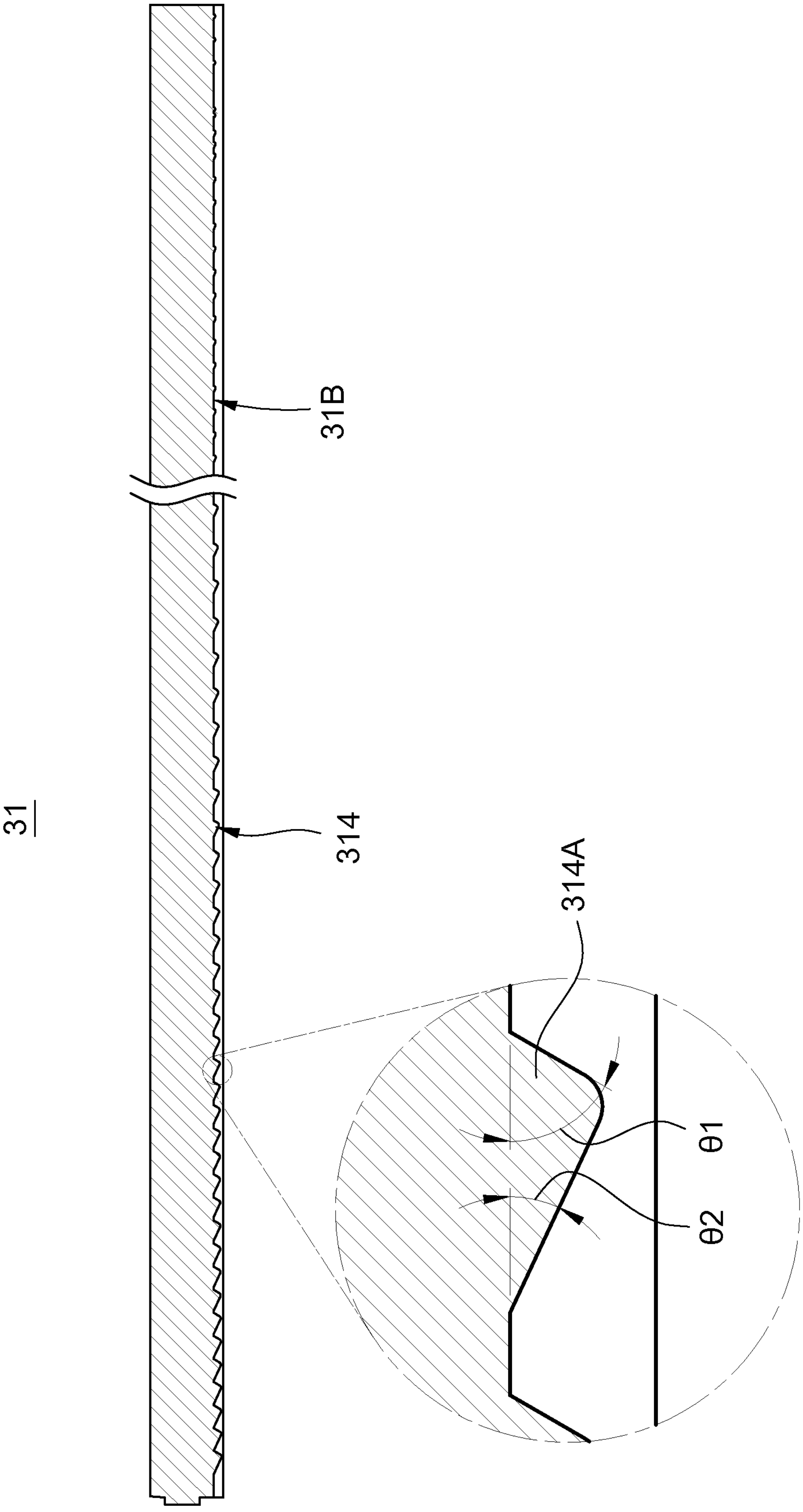
FIG. 5 is the cross-sectional view of the linear light-guiding unit of the third embodiment in the disclosure.

FIG. 5 is the cross-sectional view of the linear light-guiding unit 31 of the third embodiment in the disclosure. As shown in FIG. 5, the difference between the linear light-guiding unit 31 and the linear light-guiding unit 21 in the second embodiment is that the linear light-guiding unit 31 is free from the step structure, but has a protrusive reflection structure 314 disposed on the bottom side 31B.

The protrusive reflection structure 314 may include a plurality of protrusions 314A, and the protrusions 314A are disposed spacedly on the bottom side 31B. In some embodiments, the protrusions 314A may be equidistantly or non-equidistantly disposed on the bottom side 31B. In the embodiment, the protrusions 314A are non-equidistantly disposed on the bottom side 31B as an example, here is not intended to be limiting. Further, the sizes of the protrusions 314A may be the same or different. In the embodiment, as an example, the sizes of the protrusions 314A are gradually increased along the direction away from the light incident surface 311, here is not intended to be limiting. It is worth mentioning that the protrusive reflection structure 314 may be processed by printing, etching, or laser ablation, etc.

It is worth mentioning that the linear light-guiding unit 31 may be used in the light emitting module 1, 2, and may be cooperated with the light emitting unit 12, 22 to structure the light emitting module 1, 2. The cooperation manner is the same as the description above, here is omitted for brevity.

Figure 6:
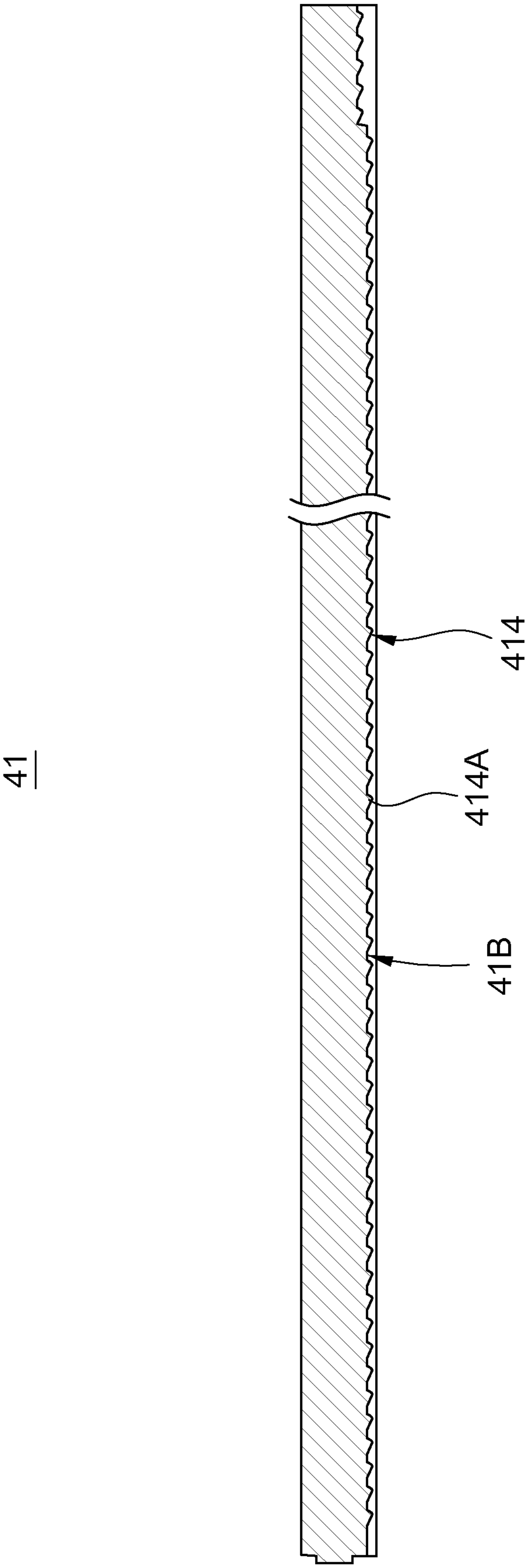
FIG. 6 is the cross-sectional view of a variant structure of the linear light-guiding unit in the disclosure.

FIG. 6 is the cross-sectional view of a variant structure of the linear light-guiding unit 41 in the disclosure. As shown in FIG. 6, the linear light-guiding unit 41 of the embodiment may simultaneously include the step structure and the protrusive reflection structure 414. The protrusions 414A of the protrusive reflection structure 414 are equidistantly disposed on the bottom side 41B. The sizes of the protrusions 414A are the same. Therefore, the design of the protrusive reflection structure 414 may be different depending on different requirement.

Referring back to FIG. 5, the protrusion 314A may be, for example, V-shaped protrusion, and two included angles θ1, θ2 are defined between the protrusion 314A and the bottom side 31B of the linear light-guiding unit 31. In some embodiments, the included angle θ1 may be greater than or equal to 30.0 degrees and equal to or less than 60.0 degrees, and the included angle (first included angle) θ2 may be greater than or equal to 15.0 degrees and equal to or less than 35.0 degrees, here is not intended to be limiting. Specifically, in some embodiments, if the included angle θ1 is 30 degrees, the included angle θ2 is, for example, 30 degrees. In some other embodiments, if the included angle θ1 is 60 degrees, the included angle θ2 is, for example, 35 degrees. In some other embodiments, if the included angle θ1 is 60 degrees, the included angle θ2 is, for example, 30 degrees. In some other embodiments, if the included angle θ1 is 60 degrees, the included angle θ2 is, for example, 25 degrees. In some other embodiments, if the included angle θ1 is 60 degrees, the included angle θ2 is, for example, 20 degrees. It should be noted that the aforementioned parameters are merely examples, the setting may be different corresponding to different requirements.

Thus, the linear light-guiding unit 31, 41 in the embodiments may include the protrusive reflection structure 314, 414 disposed on the bottom side 31B, 41B, thereby increasing light reflection efficiency and further increasing the light usage.

In summary, the light emitting module and the linear light-guiding unit thereof in the disclosure include a step structure disposed adjacently to the light incident surface, thereby decreasing the influence from the light emitting angle and field distribution of the light emitting unit. The reason is that, the step structure may decrease the distance of the incident light to the reflection surface, which makes the reflection path of the incident light shorter and also decreases the outgoing path, and further increase light usage. Moreover, the light emitting module and the linear light-guiding unit thereof in the disclosure also include an arched light emitting structure located on the light emitting surface of the linear light-guiding unit, thereby decreasing scattering light to concentrate the outgoing light. Comparing to using the other reflection structure for preventing scattering light, the disclosure may further increase light output efficiency and decrease total cost. Further, the light emitting module and the linear light-guiding unit thereof in the disclosure may include a protrusive reflection structure disposed on the bottom side, thereby increasing light reflection efficiency and further increasing the light usage.

While this disclosure has been described by means of specific embodiments, numerous modifications and variations may be made thereto by those skilled in the art without departing from the scope and spirit of this disclosure set forth in the claims.

What is claimed is:

1. A light emitting module, comprising:

a linear light-guiding unit, comprising a light incident surface located on a side end thereof, an arched light emitting structure disposed on a top side thereof, and a protrusive reflection structure disposed on a bottom side of the light-guiding unit opposite to the arched light emitting structure; and a light emitting unit, disposed on the light incident surface, wherein the light emitting unit is configured to emit a light to enter the linear light-guiding unit through the light incident surface, and the light is reflected by the protrusive reflection structure and emits from the arched light emitting structure;

wherein on a side view, a first included angle is defined between the protrusive reflection structure and the bottom side, and the first included angle is greater than or equal to 15.0 degrees and equal to or less than 35.0 degrees, the protrusive reflection structure comprises a plurality of protrusions, and the protrusions are equidistantly or non-equidistantly disposed on the bottom side.

2. The light emitting module according to claim 1, wherein the first included angle is greater than or equal to 20.0 degrees and equal to or less than 30.0 degrees.

3. The light emitting module according to claim 1, wherein the arched light emitting structure comprises a first width on a cross-sectional view, the bottom side of the linear light-guiding unit comprises a second width on the cross-sectional view, and the first width is greater than the second width.

4. The light emitting module according to claim 3, wherein a second included angle is defined between two side edges of the linear light-guiding unit, and the second included angle is greater than or equal to 10.0 degrees and equal to or less than 50.0 degrees.

5. The light emitting module according to claim 1, wherein the linear light-guiding unit further comprises a first reflection surface and a second reflection surface, the first reflection surface and the second reflection surface are located on the bottom side, the first reflection surface is adjacent to the light incident surface, the second reflection surface is adjacent to the first reflection surface, the first reflection surface and the second reflection surface are located at different planes, and the protrusive reflection structure is disposed on the first reflection surface and the second reflection surface.

6. A light emitting module, comprising:

a linear light-guiding unit, comprising a light incident surface, a step structure, an arched light emitting structure and a protrusive reflection structure, the light incident surface located on a side end thereof, the step structure located on a bottom side thereof and disposed adjacently to the light incident surface, the arched light emitting structure disposed on a top side of the light-guiding unit opposite to the step structure, and the protrusive reflection structure disposed on the bottom side; and a light emitting unit, disposed adjacently to the light incident surface, wherein the light emitting unit is configured to emit a light to enter the linear light-guiding unit through the light incident surface, the light is reflected by the step structure, and the light reflected by the step structure emits from the arched light emitting structure;

wherein on a side view, a first included angle is defined between the protrusive reflection structure and the bottom side, and the first included angle is greater than or equal to 15.0 degrees and equal to or less than 35.0 degrees.

7. The light emitting module according to claim 6, wherein the arched light emitting structure comprises a first width on a cross-sectional view, the bottom side of the linear light-guiding unit comprises a second width on the cross-sectional view, and the first width is greater than the second width.

8. The light emitting module according to claim 7, wherein the linear light-guiding unit is tapered from the first width to the second width on the cross-sectional view.

9. The light emitting module according to claim 7, wherein a second included angle is defined between two side edges of the linear light-guiding unit, and the second included angle is greater than or equal to 10.0 degrees and equal to or less than 50.0 degrees.

10. The light emitting module according to claim 6, wherein the protrusive reflection structure comprises a plurality of protrusions, and the protrusions are equidistantly or non-equidistantly disposed on the bottom side.

11. The light emitting module according to claim 6, wherein the first included angle is greater than or equal to 20.0 degrees and equal to or less than 30.0 degrees.

12. A linear light-guiding unit, cooperated with a light emitting unit, and the linear light-guiding unit comprising:

a light incident surface, located on a side end;

an arched light emitting structure, disposed on a top side and adjacent to the light incident surface; and a protrusive reflection structure, disposed on a bottom side opposite to the arched light emitting structure, wherein a light enters the linear light-guiding unit through the light incident surface, and the light emits from the arched light emitting structure;

wherein on a side view, a first included angle is defined between the protrusive reflection structure and the bottom side, and the first included angle is greater than or equal to 15.0 degrees and equal to or less than 35.0 degrees, the protrusive reflection structure comprises a plurality of protrusions, and the protrusions are equidistantly or non-equidistantly disposed on the bottom side.

13. The linear light-guiding unit according to claim 12, wherein the first included angle is greater than or equal to 20.0 degrees and equal to or less than 30.0 degrees.

14. The linear light-guiding unit according to claim 12, further comprising:

a step structure, located on the bottom side and disposed adjacently to the light incident surface, and the protrusive reflection structure disposed thereon.

* * * * *